US006439761B1

(12) United States Patent
Agnoff

(10) Patent No.: US 6,439,761 B1
(45) Date of Patent: Aug. 27, 2002

(54) WINDER FOR MECHANICAL WATCHES

(76) Inventor: Charles Agnoff, 1221 Great Oaks Dr., Wilmington, NC (US) 28405

( * ) Notice: Subject to any disclaimer, the term of this patent is extended or adjusted under 35 U.S.C. 154(b) by 70 days.

(21) Appl. No.: 09/746,329

(22) Filed: Dec. 21, 2000

(51) Int. Cl.[7] .......................... G09B 3/00; G09D 3/00; B01F 11/00

(52) U.S. Cl. .......................................... 368/206; 81/7.5

(58) Field of Search ................................ 368/206–210, 368/216; 81/7.5

(56) References Cited

U.S. PATENT DOCUMENTS 2,588,042 A * 4/1952 Poltrock ....................... 81/7.5
2,863,345 A 12/1958 Fiechter
2,917,955 A 12/1959 Leger
2,926,519 A 3/1960 Setterberg
3,620,007 A 11/1971 Kauffman
4,057,958 A 11/1977 Wuntch
5,608,693 A 3/1997 Richards
5,988,871 A 11/1999 Bonnet
D440,583 S * 4/2001 Greene, Jr. ................ D15/199
6,254,270 B1 * 7/2001 Agnoff ....................... 368/206
D452,256 S * 12/2001 Wolf ......................... D15/199
D455,449 S * 4/2002 Siu .............................. 81/7.5

FOREIGN PATENT DOCUMENTS

EP 0 392 980 A1 9/1990

* cited by examiner

*Primary Examiner*—Vit Miska
*Assistant Examiner*—Jeanne-Marguerite Goodwin
(74) *Attorney, Agent, or Firm*—MacCord Mason PLLC

(57) ABSTRACT

A winder for mechanical manually-wound watches is described that includes a housing, with a watch support in front of the housing front wall to support a watch with its stem aligned along a first given longitudinal axis. A support shaft extending from the housing front wall has an outer end attached to the watch support and is moveable along a parallel second given longitudinal axis. A rotatable shaft having a front end with a crown collet extends from the front wall along the first longitudinal axis to attach the watch crown to the crown collet. The rotatable shaft is rotated on a timed sequence by a motor that is in a circuit with a potentiometer which detects when the motor load increased, indicating that the watch spring is fully wound. A controller disconnects the motor when the potentiometer detects that the watch is fully wound.

19 Claims, 4 Drawing Sheets

WINDER FOR MECHANICAL WATCHES

BACKGROUND OF THE INVENTION (1) Field of the Invention

The present invention relates generally to an electronic watch winder, and in particular to a watch winder that is useful in winding stem-wound watches.

(2) Description of the Prior Art

In mechanical watches, as opposed to battery-powered watches, a mainspring exerts a force against a series of interconnected gears, balance wheels and escapements that rotate the watch hands and other components. The two basic types of mechanical watches are automatic or self-winding watches, and manually-wound watches. The mainsprings in automatic watches are wound by rotating or oscillating an attached weight by normal movement of the user's wrist. Springs in manually-wound watches are wound by rotation of a stem or crown that has an inner end in operative communication with the mainspring and an outer end projecting from the watch case to be grasped by the user.

The mainspring of an automatic watch is wound sufficiently to continue watch operation so long as the user wears the watch. However, the watch will stop if it is not worn for a period of time, requiring the user to reset the watch to the correct time when the watch is again worn. Manual-winding mechanisms are often used in watches, which include additional mechanisms, known as complications, to provide other information, e.g., the date or moon phases, in addition to the time. The complexity of these watches is such that resetting the watch is a complicated task, in some cases even requiring the services of a jeweler to reset the watch.

Various mechanisms called watch winders have been designed to wind the springs of self-winding watches when the watches are not being worn. Basically, these watch winders are comprised of a watch support to hold the watch at a desired orientation on the winder and a means for moving the watch support in a predetermined pattern, usually at periodic intervals. The movement pattern is preferably designed to simulate the movement of a user's wrist, thereby rotating or oscillating the weight in accordance with the watch's design to keep the spring wound. Examples of such devices are described in the following U.S. patents:

| U. S. Pat. No. | Inventor(s) |
|---|---|
| 2,863,345 | Fiechter |
| 2,917,955 | Leger |
| 2,926,519 | Setterberg |
| 3,620,007 | Kauffman |
| 4,057,958 | Wuntch |
| 5,608,693 | Richards |

The devices described in the above patents, while being suitable to varying degrees in the winding of self-winding watches, are of no use in the winding of stem-wound watches that require rotation of the watch crown relative to the watch case. U.S. Pat. No. 5,988,871 to Bonnet, on the other hand, describes a device that is designed to address the need to wind mechanical crown-wound watches. The Bonnet device is basically comprised of a watch holder that supports the watch with the watch stem aligned along a given longitudinal axis; a gripping assembly that includes a shaft aligned along the given longitudinal axis, with multiple claws at the end of the shaft toward the watch holder for gripping the crown of the watch; and an electric motor for intermittently rotating the collet shaft while the stem crown is gripped by the claws, thereby winding the watch spring.

Different brands and styles of manually-wound watches, and even manually-wound watches of the same brand or style, require different numbers of stem rotations, e.g., from about 20 to about 80 rotations, to fully wind the watch spring. Also, the number of rotations needed to fully wind a given watch will depend on the extent to which the watch has been unwound when winding is initiated. Therefore, a winding device cannot simply wind all watches for the same number of rotations. If so, some watches would be overwound, risking damage to the watch mechanism, while other watches would be underwound, resulting in the watch ultimately stopping.

Bonnet recognizes this problem and attempts to solve it by requiring the user to manually set the Bonnet watch winder to the characteristics of the specific watch to be wound. That is, when using the Bonnet winder, the user first winds the watch by hand while counting the number of turns required to fully wind the watch. The winder is then set with an adjustment wheel to provide a number of crown rotations approximating the number counted. Each time the watch is worn, the wearer must fully wind the watch before it is placed back on the winder. In order to prevent overwinding, the Bonnet crown grabber is spring loaded and designed to act as a clutch, so that the claws slip in the sleeve of the winding apparatus.

The solution proposed by Bonnet to address the variations in watch design and the resultant needs of manually-wound watches for differing numbers of rotations is time consuming and less than satisfactory. Setting of the Bonnet for a single watch requires the wearer to correctly estimate the number of crown rotations required to fully wind the watch, an exercise prone to error since the number of turns counted will vary depending on whether the user begins winding the watch when it is fully or only partially unwound. Then, the wearer must set the winder to simulate the correct number of turns, which is often a trial and error activity.

Also, even if the winder is correctly set, the procedure renders the winder useful for winding only a single watch. If the wearer owns two or more manually-wound watches, as is often the case, a separate winder must be purchased for each watch, or the winder must be reset each time a different watch is to be wound. Furthermore, the safety mechanism proposed to prevent overwinding allows the motor to keep running even after the watch is fully wound.

Thus, there is still a need for a winder for mechanical manually-wound watches, including both wrist watches and pocket watches, that automatically compensates for differences in watch designs, permitting the winder to be used for more than a single watch without manual resetting, as well as for a watch winder that will automatically stop when the watch is fully wound, preventing possible damage to the watch and/or the winder. A watch winder meeting these requirements which could also be used to wind self-winding watches in addition to manually-wound watches would be of particular utility.

SUMMARY OF THE INVENTION

The present invention addresses these needs by providing a mechanical watch winder that is generally comprised of a watch holder assembly to position a watch with the stem aligned along a given longitudinal axis, a crown collet that includes a rotatable shaft aligned along the longitudinal axis and a spring-loaded crown collet passing through the shaft that is toward the watch holder assembly, a DC motor operatively connected to rotate the shaft, a control assembly to disconnect the motor from the power source when the watch is fully wound, and a housing enclosing the other winder components. Additional features may be included to control the operation of the motor, and to provide information to the user.

The watch holder assembly includes a watch support to hold a watch so that the watch stem is aligned along a first given longitudinal axis. Various types of supports may be used. For example, the support can be in the form of cylinder, with the watch band being attached around the cylinder. Alternatively, the support can include clamping jaws that can be clamped onto the watch case. In this latter design, the jaws may be spring loaded.

The watch support is preferably carried on a support shaft that is aligned along a second given longitudinal axis parallel to the first given longitudinal axis along which the stem is oriented, with the shaft being moveable to set locations between inner and outer positions along the second given longitudinal axis. The shaft may also include a spring or other biasing means may be used to urge the shaft toward one of the positions, and a stop to limit the extent to which the shaft can be moved toward the inner and/or outer position.

The crown collet grips the watch crown and rotates the watch stem when the motor is energized, and includes a rotatable shaft that is aligned along the first given axis referred to above. The collet shaft has an outer end toward the watch support and an opposed inner end. A crown collet, which may be comprised of a plurality of cooperative radially expandable jaw sections, is mounted through the shaft. The crown collet may be moved from a closed position to an expanded position by moving the collet shaft in the direction of the watch support. A spring may be used to urge the shaft in the direction of the inner end.

The motor, which is preferably a DC motor powered by a 6V battery or a 6V AC/DC transformer, is operatively joined to the gripping assembly shaft to rotate the shaft when the motor is energized. Preferably, the motor and shaft are connected through a slip clutch that can be adjusted to halt shaft rotation when the shaft torque exceeds a predetermined value, even if the motor is energized. A continuous drive belt or drive gear will normally be used to connect the motor to the shaft or clutch.

A load measurement means may be used to determine when the watch spring is fully wound, with the load measurement means being connected in a circuit with the motor and the power source, e.g., the battery, and a controller. When the load measurement means determines that a predetermined load value is reached, indicating that the watch is fully wound, the controller opens the circuit between the motor and the power source.

The control circuit can also include a timer circuit to close the circuit at predetermined intervals for predetermined time periods. For example, the timer circuit can close the motor circuit every 3 to 4 hours for from 45 to 90 seconds. A control switch can also be included if it is desired to manually disconnect the circuit, or change the predetermined time interval of the timer circuit. Visual indicators, such as a milli ammeter scale to visually indicate when the load on the motor is exceeded, and an LED or other means to indicate when the battery is low, can also be positioned within the winder circuit. By operating every 3 to 4 hours, the mainspring tongue is virtually constant, an important feature for maintaining the timekeeping accuracy of the watch in question.

The winder is used by mounting a watch onto the watch support so that the stem is aligned along the first given longitudinal axis, and the crown collet is locked over the crown. The winder can then be started manually by a switch, or by the timing mechanism. When the winder is started, the control circuit closes to energize the motor to rotate the shaft and crown collet, thereby winding the watch spring.

If the load on the motor is maintained below a preset value, winding continues for a predetermined time, after which the circuit is opened. The control circuit then closes again after a predetermined rest period to restart the cycle. If the watch approaches fully wound during a cycle, the mainspring will resist further turning of the shaft, placing a load on the motor, i.e., increases torque on the motor shaft, and thereby increasing the current flow to the motor. This increase in amperage is detected by a potentiometer in the control circuit, which is designed to open the circuit when a preset amperage value is reached, thereby disconnecting the motor and exertion of force against the shaft and other watch components. Thus, damage to the mainspring or other parts of the watch mechanism is prevented.

Some manually-wound mechanical watches are constructed so that the crown screws down into the watchcase to prevent water from entering into the case through the stem opening. Before winding these watches, the crown is unscrewed and slightly withdrawn from the case so that the stem can be rotated. After winding, the crown is pushed inwardly and rotated in a clockwise manner to lock the crown into the case.

In order to wind watches with locking crowns, it is necessary to prevent the collet from pressing inwardly on the watch during winding. Otherwise, the gripping assembly, which is designed to rotate the stem in a clockwise direction, will force the crown back into the locked position. This problem is prevented in the present invention by providing a stop on the watch holder shaft as noted earlier.

Thus, when winding watches of this design, the watch crown is unlocked and the watch is mounted onto the watch support. The watch holder assembly is then moved inwardly until the gripping member grips the unscrewed crown. The stop is then adjusted on the shaft to prevent further inward movement of the watch holder assembly. Therefore, when the watch stem is wound, the gripping assembly and the watch holder assembly are maintained in a constant spaced relationship, preventing the crown from being returned to the locked position. Alternately, a non-metallic clip can be snapped in place over the threaded winding stem to prevent the crown from moving in and threading itself.

As an additional safety precaution, the collet shaft may be connected to the motor through an adjustable slip clutch. For example, the shaft can be attached to the clutch, and a belt or gear train can connect the motor to the clutch. The slip clutch is designed so that slippage will occur between the drive part of the clutch, i.e., the part connected to the motor, and the driven part, i.e., the collet shaft, when the torque on the shaft exceeds a predetermined value. Thus, when the spring is fully wound, further rotation of the shaft will be resisted, increasing the torque, and causing the clutch to slip. The slip tongue is adjustable, set by varying spring pressure against the clutch elements.

Therefore, the winder can include two safety mechanisms for preventing damage due to over winding of a watch. With either measure, rotation of the part of the winder that contacts the watch is halted when the spring is fully wound, thereby preventing damage to the watch and to the components of the winder in contact with the watch. It will be apparent to one skilled in the art that an improved winder can be made using either one of these safety mechanisms alone. However, since many mechanical watches are very valuable, the use of the safety mechanisms in combination is preferred.

Self-winding watches may also include a stem that can be used as an alternative way to wind the watch. However, unlike stem-wound watches, self-winding watches are designed so that they cannot be over wound. Therefore, while the above-described safety mechanisms are not required when winding self-winding watches, it will be apparent to one skilled in the art after reading the description, that the present winder can also be used to wind self-winding watches. In doing so, the watch is mounted on the watch support as noted above, with the watch crown being held by the crown collet. The winder is then activated at predetermined periodic intervals to wind the self-winding watch. Since the fully wound spring does not exert a resistance to shaft rotation, the winder will remain activated for the predetermined time, and then will stop until the next timed cycle.

DETAILED DESCRIPTION OF THE INVENTION

Figure 1:
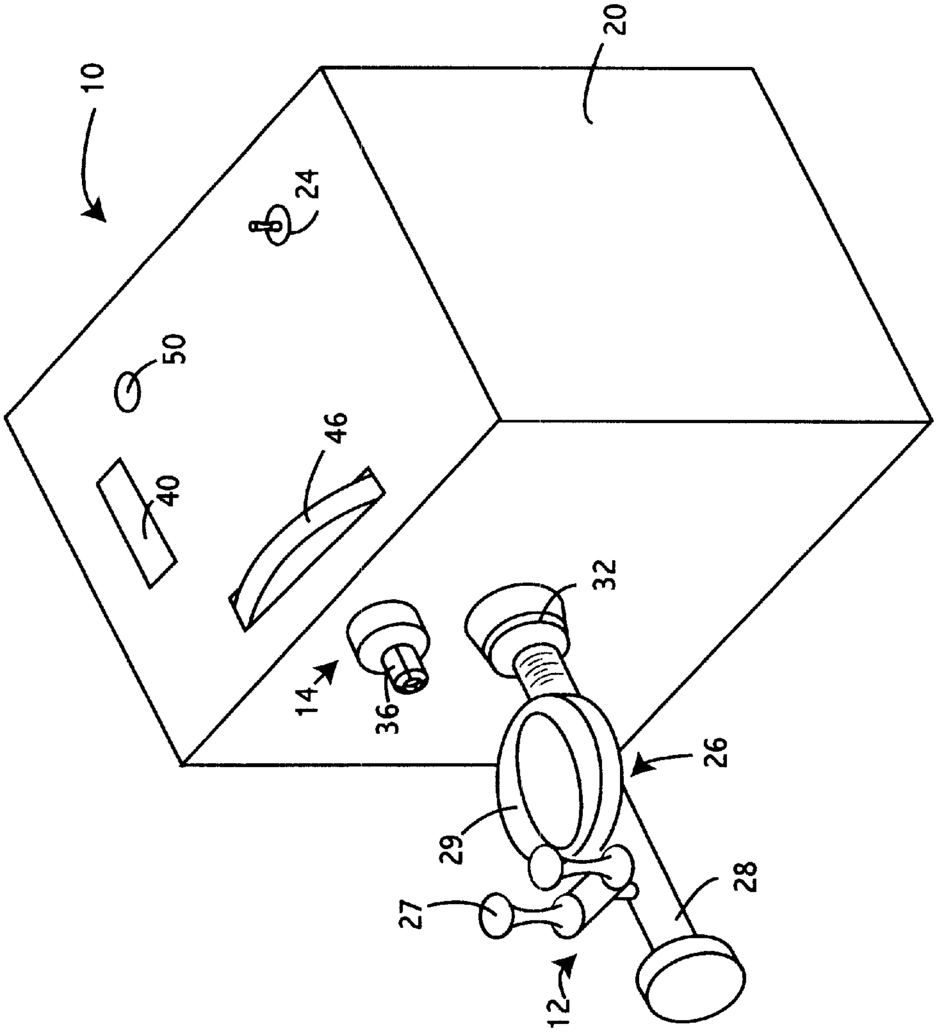
FIG. 1 is a perspective view of a preferred embodiment of the watch winder.
Figure 2:
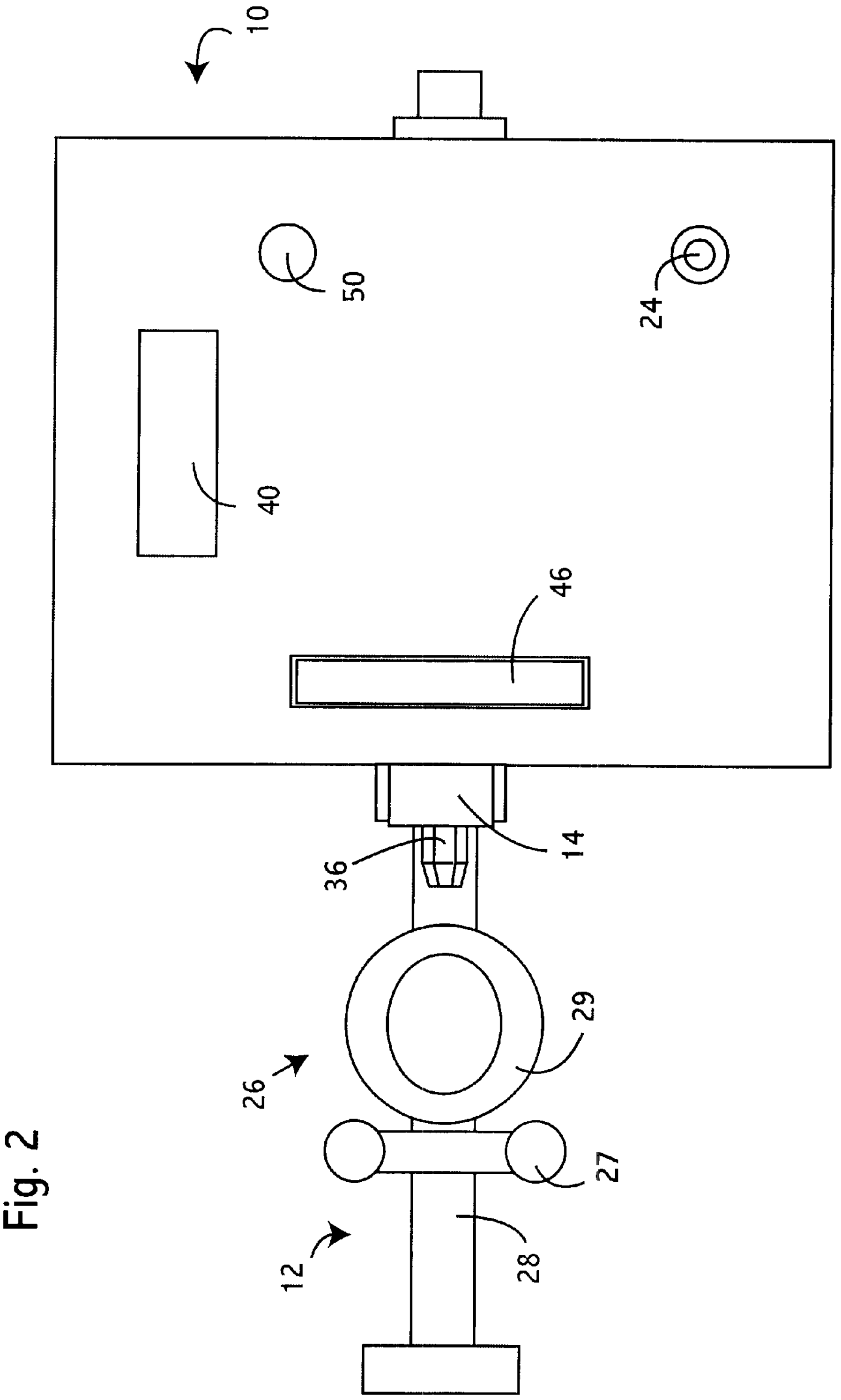
FIG. 2 is top view of the watch winder of FIG. 1.
Figure 3:
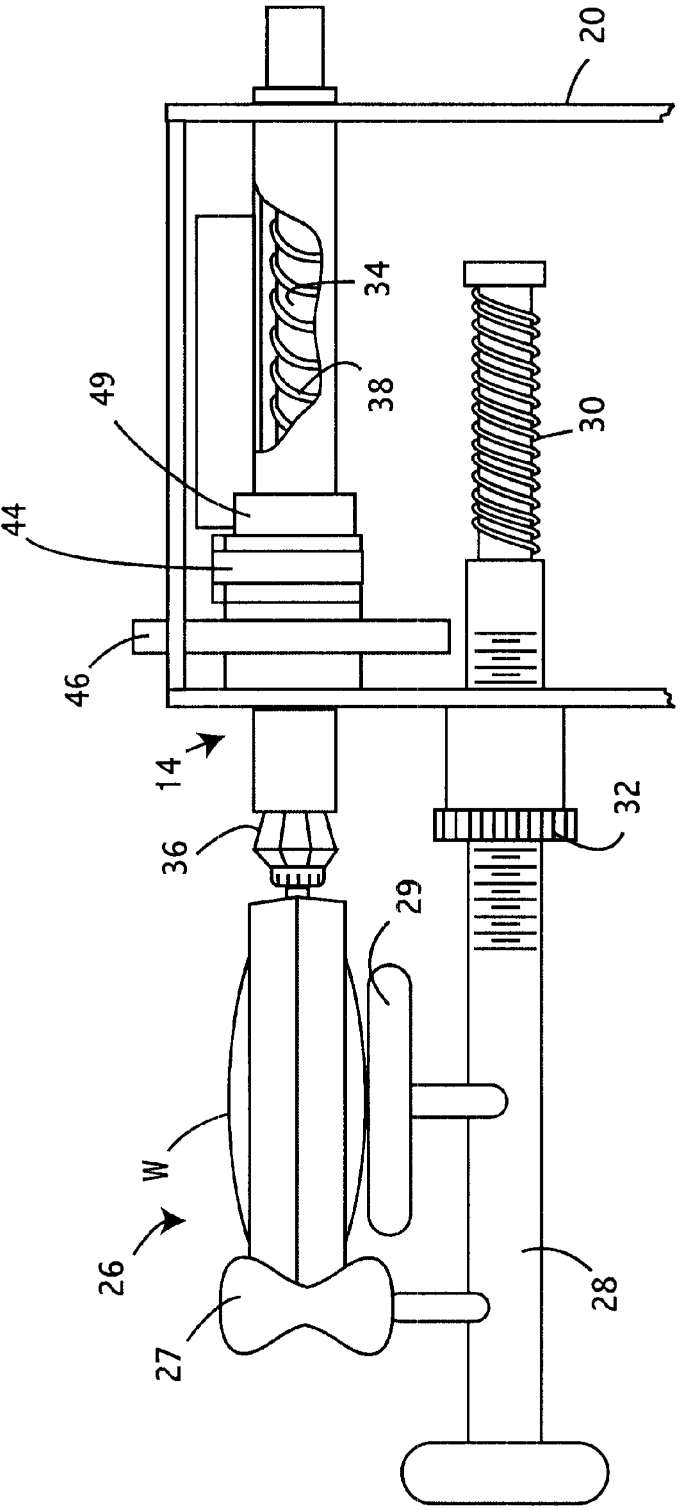
FIG. 3 is a side view of the watch winder of FIG. 1 with a side wall removed to show the relationship of some of the interior components.
Figure 4:
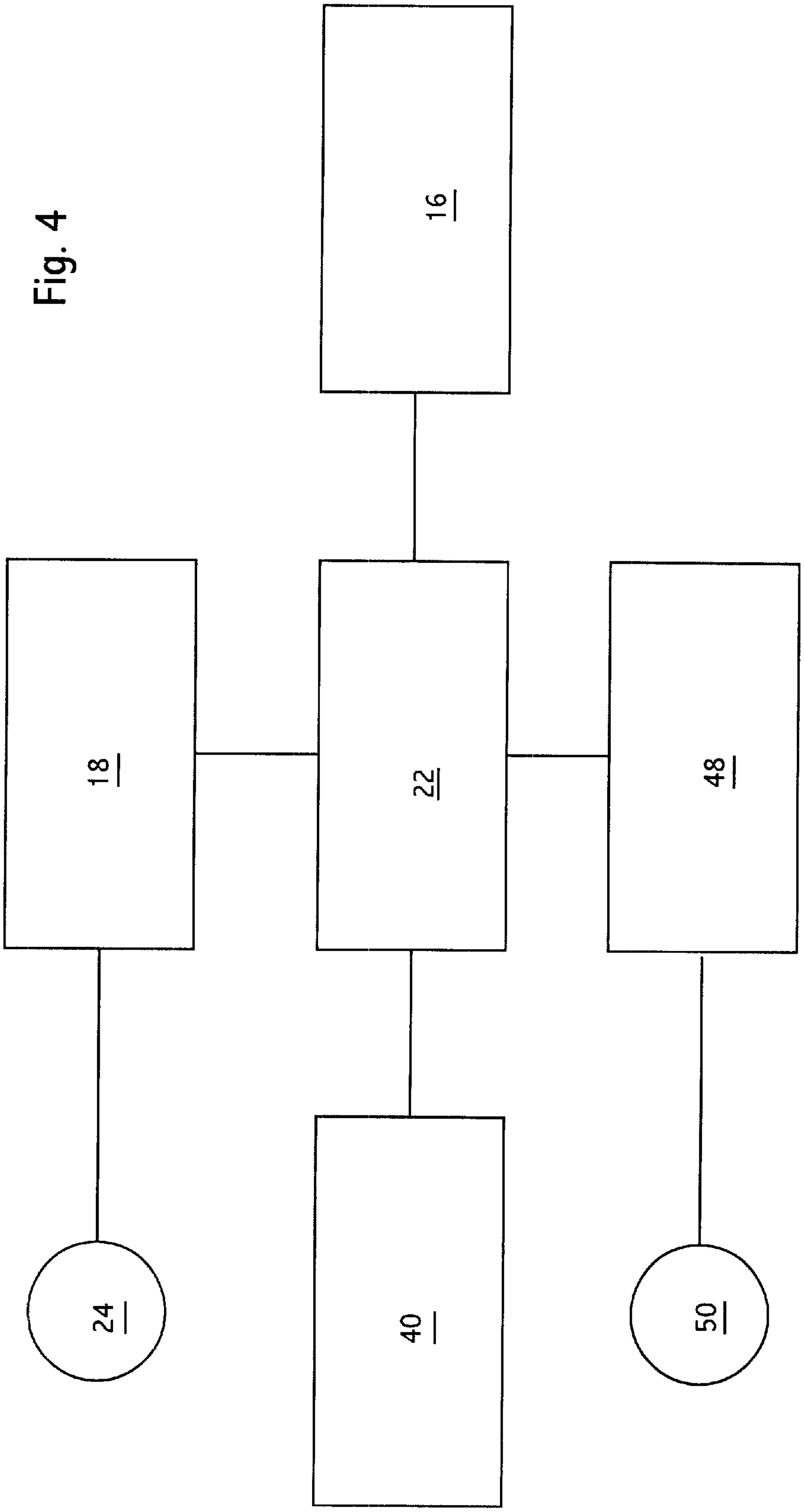
FIG. 4 is a schematic of the components connected in circuit with the watch winder motor.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

As illustrated in the drawings, a preferred embodiment of the mechanical watch winder, generally 10, is comprised of watch holder assembly, generally 12, stem gripping assembly, generally 14, DC motor 16, controller 18, and housing 20. Controller 18 is in communication with a microprocessor and potentiometer 22 and a switch 24.

Watch cradle assembly 12 includes a watch support, generally 26, to hold a watch W so that the watch stem is aligned along a first given longitudinal axis with the watch crown toward housing 20. Watch support 26 is comprised of a pair of non-metallic laterally adjustable retainers 27, and a watch platform 29, that includes a felt pad to prevent scratching. Watch support 26 is carried on the outer end of support shaft 28 that is aligned along a second given longitudinal axis parallel to the first given longitudinal axis, and extends to an inner end within housing 20. Spring 30 surrounds the inner end of shaft 28 to urge shaft 28 inwardly. Threaded stop 32 is moveable along shaft 28 and abuts the exterior of housing 20 to limit inward movement of shaft 28.

Stem collet assembly 14 includes a rotatable collet shaft 34 aligned along the first given axis. Gripping shaft 34 has a front end toward the watch support and an opposed rear end that projects from the opposite side of housing 20. Crown gripper 36 is mounted on the front end of shaft 34. Crown gripper 36 is opened by pressing on the rear end of shaft 34. Gripping shaft spring 38 urges shaft 34 towards its rear end. Motor 16, powered by 6V battery 46, is adapted to rotate collet shaft 34 through gear 46 connected through slip clutch 44, which includes spring adjustment collar 49.

Controller 18, in the form of a printed circuit board, is connected in a circuit with motor 16, battery 48, potentiometer 22, an ammeter 40, switch 24, and a low battery indicator LED 50. Controller 18 includes a timer circuit to close the circuit at predetermined intervals for predetermined time periods, and will open the circuit when the time expires, or when the current measured by potentiometer 22 exceeds a predetermined value, whichever occurs first.

In use, watch W is positioned on watch support 26 and crown collet 36 is locked over the crown. Switch 24 is moved from the center "off" to the 45 sec. or 90 sec. position, closing the control circuit to energize motor 16 for the selected time. Motor 16 then rotates shaft 34 and crown gripper 36 to wind the watch spring.

If the watch spring is fully wound before the preset time expires, rotation of shaft 34 will be resisted, increasing the load on motor 16. As a result, current flow to motor 16 increases. If the amperage increases above a preset value, as measured by microprocessor and trim potentiometer 22, controller 18 will open the circuit to motor 16, preventing damage to the spring or other parts of watch W. As an additional safety feature, the load on shaft 34 will also cause slip clutch 44 to disengage if the electronic circuit fails.

Certain modifications and improvements will occur to those skilled in the art upon a reading of the foregoing description. It should be understood that all such modifications and improvements have been deleted herein for the sake of conciseness and readability but are properly within the scope of the follow claims.

What is claimed is:

1. A watch winder for winding a mechanical stem-wound watch having a stem with a crown, said winder comprising:

a) a rotatable shaft attachable to said stem;

b) a motor in communication with a power source and said shaft to rotate said stem;

c) a sensor in communication with said motor to detect when said watch is fully wound; and d) a controller in a circuit with said motor and said power source to disconnect power to said motor when said sensor detects that said watch is fully wound.

2. The watch winder of claim 1, wherein said sensor is a potentiometer.

3. The watch winder of claim 1, wherein said motor communicates with said shaft through a detachable shaft connector.

4. The watch winder of claim 1, wherein said shaft has a longitudinal axis, and said winder further includes a watch support to support said watch with said stem aligned with said longitudinal axis.

5. The watch winder of claim 1, wherein said shaft includes radially expandable crown collet to grip said crown.

6. The watch winder of claim 1, wherein said power source is a battery.

7. The watch winder of claim 1, wherein said controller includes a timer circuit to close said circuit for a predetermined period of time, unless said sensor detects that said watch is fully wound.

8. A watch winder for winding mechanical manually-wound watches having a stem with a crown, said winder comprising:

a) a watch support for supporting said watch with said stem and crown aligned along a first given longitudinal axis;

b) a support shaft having an inner end and an outer end, said outer end being attached to said watch support, said support shaft being moveable along a second given longitudinal axis parallel to said first given longitudinal axis;

c) a rotatable shaft having a front end attachable to said stem, said rotatable shaft being aligned along said first given longitudinal axis, said support shaft being moveable along said second longitudinal axis to connect said crown to said rotatable shaft front end;

d) a motor in communication with a power source and said rotatable shaft to rotate said stem;

e) a sensor in communication with said motor to detect when said watch is fully wound; and f) a controller in a circuit with said motor and said power source to disconnect power to said motor when said sensor detects that said watch is fully wound.

9. The watch winder of claim 8, wherein said support shaft has inner and outer positions, said winder further including a spring to urge said support shaft toward said inner position, and an adjustable stop limiting the inner movement of said support shaft.

10. The watch winder of claim 8, further including a housing with front and back sides, said support shaft projecting from said front side, and said rotatable shaft having the front end projecting from said front side and a back end projecting from said back side.

11. The watch winder of claim 8, wherein said rotatable shaft has radially expandable gripping jaws at its front end.

12. The watch winder of claim 8, further including a slip clutch connecting said motor to said rotatable shaft.

13. A watch winder for winding mechanical manually-wound watches having a stem with a crown, said watch comprising:

a) a housing having front and back walls and a top wall;

b) a watch support in front of said front wall for supporting said watch with said stem aligned along a first given longitudinal axis;

c) a support shaft extending from the housing front wall, said support shaft having an inner end and an outer end, said outer end being attached to said watch support, said support shaft being moveable along a second given longitudinal axis parallel to said first given longitudinal axis between inner and outer positions;

d) a rotatable shaft having a front end extending from said front wall, said rotatable shaft having the front end including a crown collet attachable to said crown, said rotatable shaft being aligned along said first given longitudinal axis, said support shaft being moveable along said second longitudinal axis to connect said crown to said rotatable shaft front end;

e) a motor in said housing in communication with a power source and said rotatable shaft to rotate said stem;

f) a potentiometer to detect when said watch is fully wound; and g) a controller in a circuit with said motor and said power source to disconnect power to said motor when said potentiometer detects that said watch is fully wound.

14. The watch winder of claim 13, further including a milliammeter mounted to said top wall to visually indicate when said watch is fully wound.

15. The watch winder of claim 13, further including a low battery indicator.

16. A watch winder for winding mechanical manually-wound watches having a stem with a crown, said winder comprising:

a) a rotatable shaft attachable to said stem;

b) a motor in communication with a power source and said rotatable shaft to rotate said stem;

c) a detachable shaft connector joining said motor to said rotatable shaft, said connector detaching said motor from said rotatable shaft when said watch is fully wound, and;

d) a sensor in communication with said motor to detect when said watch is fully wound.

17. The watch winder of claim 16, wherein said rotatable shaft has a longitudinal axis, and said winder further includes a watch support to support said watch with said stem aligned along said longitudinal axis.

18. The watch winder of claim 16, wherein said connector is an adjustable slip clutch.

19. The watch winder of claim 16, further including a timer circuit for activating said motor for a predetermined period of time.

* * * * *